United States Patent [19]
Holly

[11] 3,869,757
[45] Mar. 11, 1975

[54] MOLDING APPARATUS WITH VALVED AIR RELEASE

[75] Inventor: Harry H. Holly, Olympia Fields, Ill.

[73] Assignee: Hollymatic Corporation, Park Forest, Ill.

[22] Filed: Jan. 24, 1974

[21] Appl. No.: 436,192

[52] U.S. Cl. .................................................. 17/32
[51] Int. Cl. ............................................. A22c 7/00
[58] Field of Search ......................................... 17/32

[56] References Cited
UNITED STATES PATENTS
| | | | |
|---|---|---|---|
| 2,954,586 | 10/1960 | Wacker | 425/812 |
| 2,962,761 | 12/1960 | Hobson | 425/812 |
| 2,976,571 | 3/1961 | Moslo | 425/812 |

*Primary Examiner*—Robert Peshock
*Attorney, Agent, or Firm*—Hofgren, Wegner, Allen, Stellman & McCord

[57] ABSTRACT

A mold apparatus for molding a pressurized plastic material and especially a food material such as ground raw meat, fish and the like in which the apparatus comprises a shaping mold opening for receiving a pressurized charge of the plastic material to fill the opening, an escape passage for venting gas and particularly air from the mold opening during filling of the opening with the material and a pressure responsive elastic solid valve in the mold opening having a first surface portion defining a part of the mold opening to determine the shape of the charge and a substantially unconfined second portion defining a part of the escape passage with the result that pressure of the pressurized plastic material in the mold opening on the first surface portion compresses the elastic solid and projects the unconfined first surface portion across the gas vent passage to block it and prevent escape of the plastic material immediately after substantially all of the gases have been forced from the mold opening by the entering plastic material.

8 Claims, 4 Drawing Figures

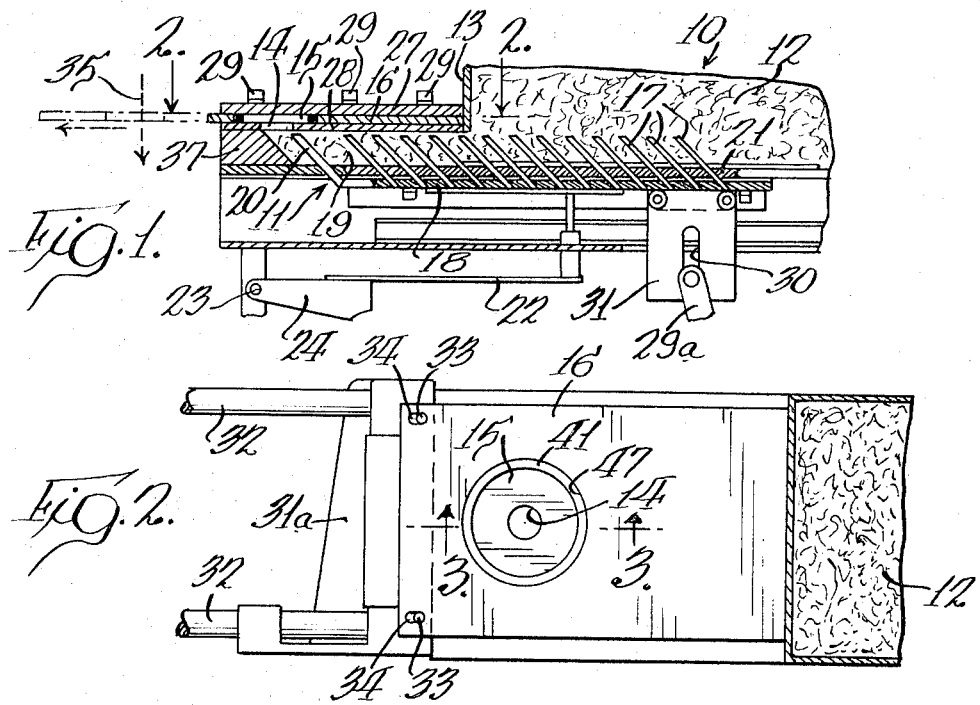
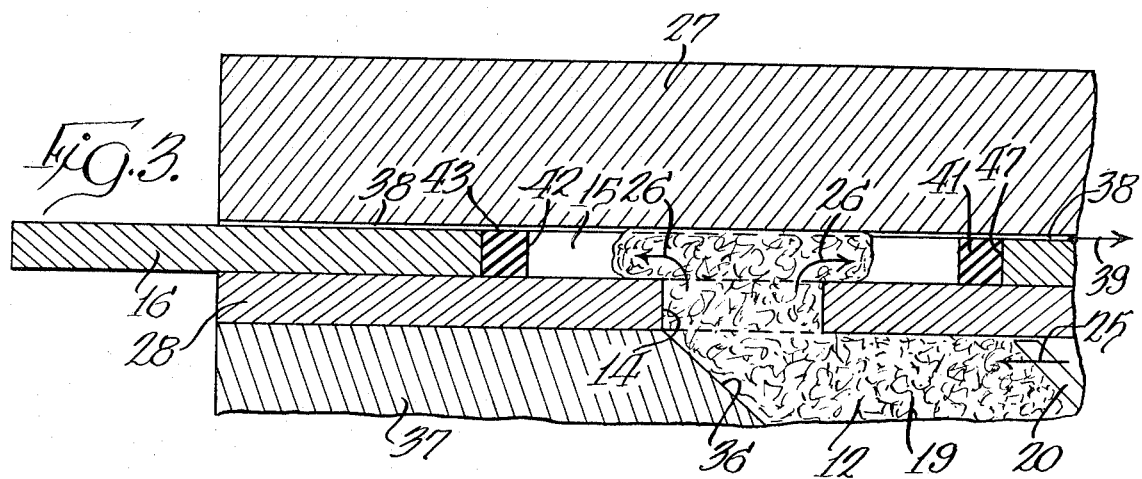
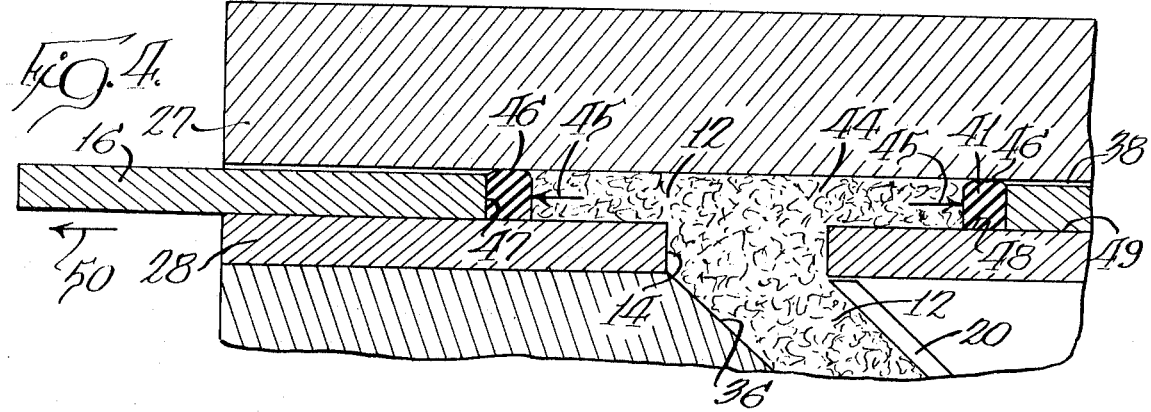

MOLDING APPARATUS WITH VALVED AIR RELEASE

SUMMARY OF THE INVENTION

One of the features of this invention is to provide a mold apparatus having the above characteristics in which the entering charge of pressurized moldable plastic material forces the air and other gases that are in the mold opening ahead of the charge through an escape passage vent and when the mold is filled with the plastic material compressing a solid elastic valve member to distort a portion of it across the escape passage to close the passage and prevent the escape of any substantial quantities of the plastic material.

Other features and advantages of the invention will be apparent from the following description of one embodiment as shown in the accompanying drawings.

BRIEF DESCRIPTION OF THE DRAWINGS

FIG. 1 is a fragmentary vertical sectional view of a molding device as disclosed and claimed in my prior U.S. Pat. No. 3,293,688 and showing the feeder means at the completion of its movement toward the mold opening and after the mold opening or cavity has been filled.

FIG. 2 is a fragmentary horizontal sectional view taken substantially along line 2—2 of FIG. 1.

FIG. 3 is an enlarged vertical sectional view taken substantially along line 3—3 of FIG. 2 and illustrating the movement of the plastic material at the beginning of the mold opening filling operation.

FIG. 4 is a view similar to FIG. 3 but showing the parts at the completion of the filling of the mold opening.

DESCRIPTION OF THE PREFERRED EMBODIMENT

In my above prior patent which is assigned to the same assignee as the present application the general apparatus is disclosed in detail and claimed. For the purposes of this invention only those parts necessary to illustrate the invention are shown.

Thus the mold apparatus 10 comprises a feeder 11 to force the plastic material such as the ground meat 12 from a supply means such as a hopper 13 through an exit 14 from the supply means 13 and which also serves as an entrance to the mold cavity or opening 15 which in the embodiment illustrated is a circular opening in a reciprocable flat mold plate 16.

Although in the illustrated embodiment there is disclosed only a single mold opening 15 the invention is equally applicable to multiple opening devices for molding and shaping a plurality of articles at the same time such as disclosed by the apparatus in U.S. Pat. No. 3,765,056 also assigned to the same assignee.

The feeder means 11, as explained in detail in the first above patent, is essentially a four motion feeder that comprises forwardly sloped spaced pins 17 mounted on a bottom plate 18 and sloped forwardly toward the front of a supply passage 19 that is at the bottom of the hopper 13. At the front of the plate 18 on which the pins 17 are mounted there is provided a forwardly sloped feeder bar 20 that extends substantially completely across the generally horizontally rectangular passage 19.

In the first of the four motions the feeder means 11 is lowered from the position shown in FIG. 1 to beneath the hopper 13 but with the upper ends of the pins 17 retained in the horizontally reciprocable pin plate 21. This lowering is accomplished by dropping the lever 22 about its fulcrum 23 by engagement with a cam (not shown) operating on a cam follower 24. Then in the second motion the feeder means 11 is retracted to the right as viewed in FIG. 1 with the lowered pins 17 and feeder bar 20 still in engagement with the plate 21. In the third motion the feeder means 11 is raised substantially vertically to re-introduce the feeder bar 20 and pins 17 into the bottom of the hopper to substantially the same position as shown in FIG. 1 but of course rearwardly or to the right of that shown.

Then, the fourth motion moves the feeder means 11 forwardly horizontally to the position shown in FIG. 1 to apply pressure to the plastic material 15 so that the resulting pressurized material in front of the feeder bar 20 which is moving in the direction indicated by the arrow 25 forces the material up through the entrance or fill opening 14 and radially outwardly as indicated in FIG. 3 by the arrows 26. This forward motion as well as the opposite rearward motion is accomplished by means of a reciprocable hinged lever 29a engaging a vertical slot 30 in a downward extending bracket 31 that is attached to the bottom of the feeder plate 18.

As is shown in FIG. 1 the mold plate 16 is reciprocated horizontally between top 27 and bottom 28 plates that are held in this relationship by spaced bolts 29. As is true in apparatus of this type and as is explained most fully in the first above patent the horizontal reciprocation of the mold plate 16 is in timed relationship to the movement of the feeder 11 so that the feeder moves forwardly or to the left as shown in FIG. 1 to coincide with the time the mold opening 15 is in communication with the fill opening 14. In the first above patent the mold plate is so timed that the opening 15 communicates with the fill opening 14 when the feeder bar is moving toward its forwardmost position as shown in FIG. 1.

In the illustrated apparatus the filling opening 14 during the filling of the mold opening 15 is circular and substantially concentric to the similarly circular mold opening 15. This concentric arrangement is preferred whether the resulting patties are circular or chop shaped or any other desired configuration. However, it is only necessary that the fill opening 14 be spaced inwardly of the outer periphery of the mold opening 15 so that the entering pressurized material can first enter the mold opening 15 and then flow generally radially outwardly.

The mold plate 16 as is explained in the first above patent is driven in its horizontal reciprocation by mold moving means comprising the slidable member 31a moved back and forth on parallel rods 32. This slidable member 31a carries upwardly projecting side pins 33 each of which engages an elongated slot 34 for movement of the mold plate forwardly to the patty knockout position illustrated by the broken lines to the left of FIG. 1 where the patty is removed in the customary manner as indicated by the vertical arrow 35.

As can be seen most clearly in FIG. 3 the forward end of the passage 19 is defined by an upwardly sloped surface 36 on a spacer block 37 that is immediately beneath the bottom plate 28. The compressing of the moldable material 12 between the approaching feeder bar 20 and the sloped surface 36 pushes the material to force it into the mold opening 15 in the manner previously described.

In order to vent entrapped gases and particularly air that are in the mold opening 15 and which would otherwise tend to interfere with producing uniform patties there is provided a clearance between the mold opening 16 which in the illustrated embodiment is at the top thereof and the bottom of the top plate 27 to provide an escape passage 38 for the air. This escape passage extends horizontally from the mold opening so that the entering pressurized material illustrated by the arrows 26 in FIG. 3 forces the air out ahead of it as illustrated by the arrow 39. This vent passage 38 in an apparatus for molding flat patties of ground raw beef is of the order of 0.015 inch high or can be somewhat more. The important fact is that the air being of very low viscosity escapes radially through the vent passage 38 but that the ground meat being a mixture of solids and liquids with some air entrapped between the particles of the ground material being of much higher viscosity has a much greater reluctance to flow through the narrow passage 38.

In order to close the air vent passage 28 when the air has all been forced out and thereby prevent escape of the plastic material itself there is provided a pressure responsive elastic solid valve member 41 at the periphery of the mold opening 15 having a first surface portion 42 defining the peripheral part of the mold opening 15 and a substantially unconfined second portion 43 defining a part of the escape passage 38. The term unconfined means that this surface portion 43 is free to expand under applied forces and being elastic as soon as the deforming force is removed therefrom the entire solid elastic valve member or ring resumes its initial unstressed shape as viewed in FIG. 3. This of course is the nature of elastic solids.

As illustrated in FIG. 2 the solid elastic valve member 41 in the illustrated embodiment is a circular ring around the periphery 44 of the plate opening 15. The entering pressurized material 26 which relative to the escaping air is substantially uncompressible first enters the opening 15 and then radiates outwardly as shown by the arrows 26 so that as soon as the mold opening is filled with material to form the circular patty 44 the pressurized material acts radially against the elastic valve 41 as indicated by the arrows 45 to apply an outwardly compressing force to the elastic member 41 where it is held between the rigid mold plate 16 and the pressurized material 12. This compressing of the elastic valve member 41 bulges it at its unconfined surface portion 43 to project the top 46 in the illustrated embodiment across the vent passage 38 and block loss of plastic material 12. Before this can occur of course the air and any other gases have all been forced from the mold opening as previously described and as illustrated at 39 in FIG. 3.

Because there is ample clearance at the passage 38 for venting the air 39 from the mold opening the pressure requirements for forcing the pressurized plastic material into the mold opening 15 is greatly reduced from that normally required. Thus it is not necessary to apply pressure against a trapped body of air or similar fluid but it is only necessary to supply sufficient pressure to the entering plastic material 26 to force the low viscosity air 39 out through the passage 38 and when the opening is filled as illustrated by the patty 44 in FIG. 4 to compress the solid elastic ring 46 and project the distorted portion 46 of the ring across the vent passage 38 to block the outwardly flow of plastic material.

The compressible elastic solid material of the valve member ring 41 may be any desired solid elastic as long as it is capable of returning to its original shape after a distorting force has been released and is inert to its environment which of course includes the plastic material 12. This inertness is of course very important especially when the plastic material is a food product. Resilient nylon is a good example of such a solid elastic.

When the outwardly radiating pressure 45 of the plastic material 12 distorts the ring 41 as indicated at 46 in FIG. 4 the ring of course is held by the solid backing of the opening 47 in the mold plate 16 in which the ring 41 is held. The ring is also positioned against the solid surface portion 48 which is the top of the bottom plate 28 in the illustrated embodiment. The pressure 45 therefore on the inner circumference of the ring 41 produces a main distortion upwardly as shown at 46 to close the escape passage 38. However, there is also downward distortion to block any leakage that might occur in the narrow space 49 between the mold plate 16 and the bottom plate 28.

After the mold opening which in this embodiment is defined by the inner circumference 42 of the valve member 41 is filled to produce the patty 44 as illustrated in FIG. 4 the mold plate 16 is moved outwardly as previously described and as indicated by the arrow 50. Although this causes the top and bottom surfaces of the elastic ring 46 to rub against the solid surfaces against which they bear this is no problem particularly in molding food products such as meat because of the lubricating juices that are present.

I claim:

1. Mold apparatus for molding a pressurized plastic material, comprising: means defining a mold opening for receiving an opening-filling charge of said pressurized material; means defining an escape passage for venting gases from the mold opening during filling of said opening with said material; and a pressure responsive elastic solid valve member at the mold opening having a first surface portion defining a part of said mold opening and a substantially unconfined second portion defining a part of said escape passage, pressure of said pressurized plastic material in the mold opening on said first surface portion thereby projecting a pressure distorted portion of said second portion of the solid elastic member across and blocking said escape passage upon substantially complete filling of said mold opening with said material.

2. The apparatus of claim 1 wherein said mold is a patty mold and said mold opening has a periphery at which is located said elastic member.

3. The apparatus of claim 2 wherein said elastic solid member extends completely around the periphery of said mold opening to provide a closed ring.

4. The apparatus of claim 1 wherein there are provided means defining a mold fill passage for said pressurized material having an entrance to the cavity spaced from said elastic solid valve member.

5. The apparatus of claim 1 wherein said mold comprises a flat plate having side surfaces with an opening therebetween and said elastic solid valve member extends around and within the periphery of said opening.

6. The apparatus of claim 5 wherein said mold is a patty mold and said mold opening has a periphery at which is located said elastic member, and there are provided means defining a mold fill passage for said pressurized material having an entrance to the cavity spaced from said elastic solid valve member.

7. The apparatus of claim 6 wherein said entrance is located substantially centrally of said elastic solid valve member.

8. Mold apparatus for molding a pressurized plastic material, comprising: means defining a mold opening for receiving an opening-filling charge of said pressurized material; means defining an escape passage for venting gases from the mold opening during filling of said opening with said material; a pressure responsive elastic solid valve member at the mold opening having a first surface portion defining a part of said mold opening and a substantially unconfined second portion defining a part of said escape passage, pressure of said pressurized plastic material in the mold opening on said first surface portion thereby projecting a pressure distorted portion of said second portion of the solid elastic member across and blocking said escape passage upon substantially complete filling of said mold opening with said material; and means defining a mold fill passage for said pressurized material having an entrance to the mold opening spaced inwardly from said elastic solid valve member, said entrance and said mold opening being substantially concentric.

* * * * *